Jan. 5, 1937.    J. K. HODNETTE    2,066,935
SURGE AND OUTAGEPROOF DISTRIBUTION TRANSFORMER
Filed Sept. 9, 1933    3 Sheets-Sheet 1

WITNESSES:
Fred. C. Williams
R. J. Fitzgerald

INVENTOR
John K. Hodnette
BY O. B. Buchanan
ATTORNEY

Jan. 5, 1937. J. K. HODNETTE 2,066,935
SURGE AND OUTAGEPROOF DISTRIBUTION TRANSFORMER
Filed Sept. 9, 1933 3 Sheets-Sheet 3

WITNESSES:
Fred. C. Wilham
P. J. Fitzgerald

INVENTOR
John K. Hodnette
BY O. B. Buchanan
ATTORNEY

Patented Jan. 5, 1937

2,066,935

UNITED STATES PATENT OFFICE 2,066,935

SURGE AND OUTAGEPROOF DISTRIBUTION TRANSFORMER

John K. Hodnette, Sharon, Pa., assignor to Westinghouse Electric & Manufacturing Company, East Pittsburgh, Pa., a corporation of Pennsylvania Application September 9, 1933, Serial No. 688,803

31 Claims. (Cl. 175—294)

My invention relates to protective devices which have been particularly designed for protecting distribution transformers against high-voltage surges and against outages from any other causes, and it also relates to the transformer-installations so protected.

A distribution transformer receives power from a feeder or primary distribution mains and transforms it to a lower voltage to be supplied to a customer's or consumer's service line or secondary distribution mains. Both the feeder and the customer's service lines are usually of overhead construction and subject to lightning disturbances, so that it is necessary to protect the transformer-insulation against failure as a result of lightning disturbances originating on either the feeder or the service line. It is also necessary to protect the transformer against excessive overloads on the customer's service line, and to protect both the transformer and the feeder against short-circuits on the customer's service line, and against a failure of the transformer-insulation or an internal fault in the transformer winding which might eventually develop into a short-circuit across the high-voltage terminals of the transformer, if protective means were not provided to prevent it. These three types of fault are of increasing orders of magnitude, overloads being of the order of one and one-half to three times normal load current, secondary short-circuits producing currents of 10 to 40 times the normal value, and primary short-circuits producing currents of 5 to 10 times the values obtained for secondary short-circuits.

Years ago, primary fuse cut-outs were employed, utilizing sufficiently fine fuses to give overload protection for the transformers, but so many service interruptions were experienced that it has become universal practice now to select high-voltage fuses which will give protection only against short-circuits, that is, which will not blow until the condition of a dead short-circuit exists across the customer's service line. No protection is thus afforded against overloads because it is not desirable to trip out a distribution transformer every time there is an overload on it, but only in case the cumulative effects of successive or long-continued overloads are sufficient to heat up the transformer to the point where its insulation is about to fail. Thus, the distribution transformers would be put out of service whenever there was a sufficient lightning surge on the supply-line, (and this often occurred in spite of conventional arrester protection), and also whenever there was a short-circuit on the secondary distribution mains or consumer's service lines, and also whenever the transformer would burn up as a result of over-heating due to long-continued overloads or as a result of an internal fault. An object of the conventional primary fuse, in addition to clearing the transformer from the line in the case of a short-circuit in the secondary leads, is to prevent a winding-fault from developing into a dead short-circuit across the high-voltage terminals, which in many cases might result in an internal explosion of sufficient violence to blow off the cover.

In this stage of development of the art, as just outlined, a very significant advance in distribution-transformer design was made, as set forth in my Patent No. 1,923,727, dated August 22, 1933, in which the transformer insulation was protected by coordinated gaps, that is, the break-down voltages of the various gaps were coordinated with the strengths or break-down voltages of the insulations which they were to protect, so that, in the event of an excess-voltage condition, the gaps would break down before the insulation. This necessitated an improved type of discharge gap device which carried the excess-voltage charges to ground while at the same time limiting the magnitude of the dynamic follow-arc current to a value which would not blow the primary fuses in the brief period of time necessary for this dynamic follow-current to be finally interrupted in the protective gap-device, usually at the first current-zero. This improvement resulted in protecting the distribution transformers against all excess-voltage surges short of a direct stroke or near-direct stroke, so that an outage would not occur unless there was a dead short-circuit on the customer's service line, or unless there was a direct or near-direct stroke of lightning on the high-voltage feeder, or unless the transformer failed from cumulative overloading.

At the time when my last-mentioned invention was made, it was the general concensus of opinion of engineers in the art, that a direct or near-direct stroke of lightning, characterized by very large surge-currents of 10,000 to 100,000 amperes, was of rather rare occurrence and might be classed as an act of God against which the engineers and operating companies could not be held responsible. Any lightning-stroke on the line, either direct or induced, produces traveling waves, moving along the line in both directions from the scene of disturbance at approximately the speed of light, and calculations have showed that, with typical line-surge-impedances, and insulator flashover values, the currents accompanying these traveling waves could not exceed about 2,000 amperes on distribution lines. My previously mentioned invention was designed to take care of such traveling-wave surges and to prevent service-interruptions when they entered the transformers.

Field experience with my transformers, with coordinated-gap insulation-protection against traveling-wave surges, has shown, however, that the probability of occurrence of direct or near-direct strokes is much greater than was originally supposed, resulting in failures of the coordinated discharge gaps in about one-half of one percent of all of the distribution transformers which were in service in a region of considerable lightning disturbances in about a year's time. In some cases the internally mounted gaps were disrupted with such violence as to blow off the transformer-cover, and occasionally these surge-currents were so heavy as to blow the porcelain-enclosed fuse cut-outs from the pole.

By developing equipment capable of reproducing, in the laboratory, the destructive effects of lightning disturbances which had been experienced in the field, I learned that there were many lightning discharges in excess of 10,000 amperes crest value, and that about a quarter of those disturbances which my original surge-proof transformer had not handled successfully must have had discharge currents of the order of 50,000 amperes crest value, or possibly higher.

My present invention is designed for the purpose of taking care of most, if not all, of these direct and near-direct strokes of lightning, and it has resulted in changes in the entire philosophy of distribution-transformer protection.

My previously mentioned invention provided discharge-gap devices for affording three-point protection for the transformer insulation, that is, for the insulation between the high-voltage winding and the transformer-casing, between the low-voltage winding and the transformer-casing, and between the two windings themselves. The protective gap device consisted of two parts, namely, a resistor and a diffuser, the latter being a quench-gap device in which a discharge-arc was produced between two spaced electrodes in the presence of fibre, sometimes known as hard fibre, which has the property of releasing large quantities of substantially un-ionized gases when subjected to the direct play of an electric arc. The gases are vented through an opening in the transformer casing, so that the arc is blown out. The fibre has the property of remaining non-conducting after such a discharge, that is, although a small quantity of carbon is formed, it is loose and is blown away by the gases, without leaving a conducting streak or path as in the case of some other insulating materials.

Both the diffuser and the resistor were encased in fibre tubes and were disposed as a unitary structure in the upper part of the transformer casing, above the transformer-coil, being connected between the high-voltage leads and the casing. The discharge was carried from the casing to ground through a specially designed discharge gap between the tank and ground. In the case of severe surges, the discharge was also carried over the coordinated low voltage bushing and to ground through the customer's neutral ground connection.

The primary function of the resistor is to limit the dynamic current to such a value that it will be interrupted by the diffuser without causing the primary fuse to blow.

My first problem in overcoming the limitations of this diffuser and resistor of my previous invention was to effect improvements in both the diffuser element and the resistor element in order to permit each of them to withstand the heavy discharge-currents of the order of 50,000 amperes and more, which field-experience indicated to be necessary to be handled. The significance of this advancement in the art will be appreciated when it is realized that my original discharge device, in common with other similar devices such as lightning arresters, would handle a surge of only about 10,000 amperes decaying to half value in 15 micro-seconds, whereas my improved device will handle a surge of 50,000 amperes decaying to half value in 100 micro-seconds. The rupturing ability of a discharge device having a surge passing through it depends quite as much on the duration as on the magnitude of the surge. Considering both magnitude and duration, my improved gap will handle a surge 40 times more severe than my original gap.

My improvements in the resistor element resulted in a design in which currents of more than 10,000 amperes could be carried by the resistor without flashing over inside the resistor-tube, and I have also provided additional means whereby extremely large currents would cause an external flash-over outside of the fibre tube within which the resistor was mounted, so as to avoid the blowing up of the resistor tube, as will subsequently be explained more fully in detail. This resulted in an arc in shunt to the resistor, thereby cutting the resistor out of circuit so that it no longer exercised its current-limiting effect. I then discovered that my improved diffuser behaves differently when carrying the heavy surge currents which are necessary to cause the resistor to flash over externally. I found that under this condition the diffuser would interrupt the dynamic follow-currents in a fraction of a cycle without waiting for the next current-zero. In other words, the diffuser needed no resistor to limit the dynamic current under conditions of heavy surge-current. A fuse-outage would occur in any case, since a surge-current of sufficient magnitude to flash over the resistor externally would by itself blow the fuse in the primary circuit leads.

An object of my invention is, therefore, to provide the improved diffuser and resistor construction just mentioned, either when utilized by itself, or in combination with the distribution transformer and primary fuse cut-out for which it was particularly designed.

A further object of my invention is to produce a transformer which will stand severe direct lightning strokes close to the transformer, without even an interruption in service to the customer. To make a transformer which is able to withstand the very high surge-currents inherent in direct lightning-strokes, without a service-interruption, it is necessary to abandon the high-voltage fuse cut-out, in favor of some other method of protection, because with the conventional fuse cut-out used with my previous surge-proof transformer, the surge-currents passed through the fuse link and in the case of a direct stroke the surge-current would be sufficient in itself to fuse the link.

The next step in my invention was, therefore, to omit this high-voltage fuse entirely, and to adopt other means for affording the necessary secondary-short-circuit and winding-fault protection. And I have found that it would be possible, at substantially no greater cost than the primary fuse protection, to give protection not only against dead short-circuits across the customer's service lines, but also at the same time to give the transformer cumulative overload protection, or burn-out protection, causing the transformer to be disconnected from the customer's service lines when, and only when, the cumulative effects of overload were sufficient to raise the temperature of the transformer-oil to a value at which the transformer-insulation is about to fail, thereby making it possible to load the transformers by actual temperatures, which is the scientific method of loading any electrical apparatus. This I accomplish by mounting, in the transformer tank, a suitable thermally operated circuit interrupter.

The omission of the previously really necessary high-voltage fuse cut-out removes the real necessity for a resistor in series with the diffuser or other coordinated protective-gap device, so that the diffuser could be directly connected, without resistance, between a high-voltage lead and the casing.

It is desirable to omit the resistor since even with the improved diffuser and resistor which I have described above, there is a limit to the amount of surge-current which the discharge-gap with its improved resistor can handle, when mounted in the transformer tank. I have tested it, when so mounted, with surge-currents up to 50,000 amperes and a duration of 100 microseconds to half value. But for very much higher surge-currents there might possibly be danger of the internal pressure produced by the arc shunting the resistor, blowing the cover from the transformer. However, I have tested my improved diffuser without resistor, with surge currents as high as 110,000 amperes and 100 micro-seconds to half value, which have been handled successfully. I know from calculations that the very maximum surge current which might flow into a distribution transformer as a result of a 20-million-volt direct stroke of lightning to the line close to the transformer would be approximately 170,000 amperes for a duration of 50 micro-seconds. Since a stroke of this kind would enter the transformer on both primary leads and the surge current would therefore divide between two diffusers, I feel confident that the gaps employing the improved diffuser without resistor will handle the surge currents present in these severe direct strokes.

The coordinated gap-device for protecting the insulation against high voltages provides a discharge-path from the high-voltage leads, immediately after they enter the transformer casing, through a diffuser to the casing and thence through a discharge gap device to ground. My thermal overload protective device may be disposed in the primary leads, inside of the transformer casing, inside the connection to the gap, and in such case it will be observed that the surge-discharge currents do not pass through the circuit-interrupting device, so that it is not necessary for the latter to be able to withstand the high discharge-currents, even for the very brief period of time during which they flow.

An object of my invention, therefore, is to provide a thermal overload protector for a transformer, or a combined thermal and short-circuit-current protector for a transformer, either with or without the complete three-point insulation-protection which cooperates therewith to provide a complete installation which is proof against, or immune from, outages of any kind short of a continued overload which is about to cause a transformer-failure and which must be corrected by the removal of the transformer and the substitution of one having a larger capacity.

I have found in some cases it is more convenient to place the thermal protective device in the phase leads of the secondary, inside the transformer-tank, rather than in the primary leads. It should be noted that with the thermal circuit-interrupting device in this location, the surge-currents will not pass through it since the coordinated low-voltage bushing which I use is so arranged that should a surge-current of extremely large magnitude flash over from the tank to the secondary following an operation of the coordinated discharge devices connected between the high-voltage winding and the tank, such flash-over would take place to the neutral and thence to the customer's ground connection. Should a surge enter the transformer from the service lines, flash-over would take place over the coordinated low-voltage bushing to the tank and thence through the discharge gap on the tank, to ground, so that in no case will the surge-current pass through the circuit-interrupting device. I prefer to utilize, for said secondary circuit-interrupter, a thermally responsive circuit-breaker mounted inside the transformer-tank.

When the breaker is located in this position, it is not in a position to give protection to the transformer in case an internal fault should develop from some hidden manufacturing defect, as would be the case if it were located in the primary leads. To make up for this inadequacy, I have found that it is only necessary to equip the internal connections to the primary winding with fusible links having an effective current rating substantially greater than the circuit interrupting device in the low-voltage circuit, so that, in the event of a short-circuit developing on the service lines the secondary circuit-interrupting device would open the circuit, rather than the primary fuse links. The only function of these fusible links is to disconnect the transformer from the line in case an internal fault should develop in the winding. It should be noted in connection with these fuse links that the only condition under which they will open the circuit is in the extremely remote possibility of an internal fault in the winding developing from some hidden manufacturing defect. Should this occur, the winding of the transformer would be severely burned and would require a major repair, so that it is not necessary to make these fuse links refillable or replaceable. It should also be noted that surge currents entering the primary lines do not pass through these fuse links but rather they pass directly through the coordinated gap devices to the tank, since these gaps are connected to the primary leads just inside the high-voltage bushings.

An object of my invention, therefore, is to provide a thermal overload protector in the secondary circuit in combination with fuse links in the primary winding, either with or without three-point insulation protection, which cooperates therewith, providing a complete installation which is proof against outages of any kind short of a continued overload of sufficient magnitude to cause a transformer burnout.

A still further object of my invention is to provide means, both manual and automatic, or either one alone, for reclosing the thermal protector, the significance of which will be hereinafter described.

With the foregoing and other objects in view, my invention consists in the apparatus, combinations, methods and systems hereinafter described and claimed, and illustrated in the accompanying drawings wherein:

Figure 7:
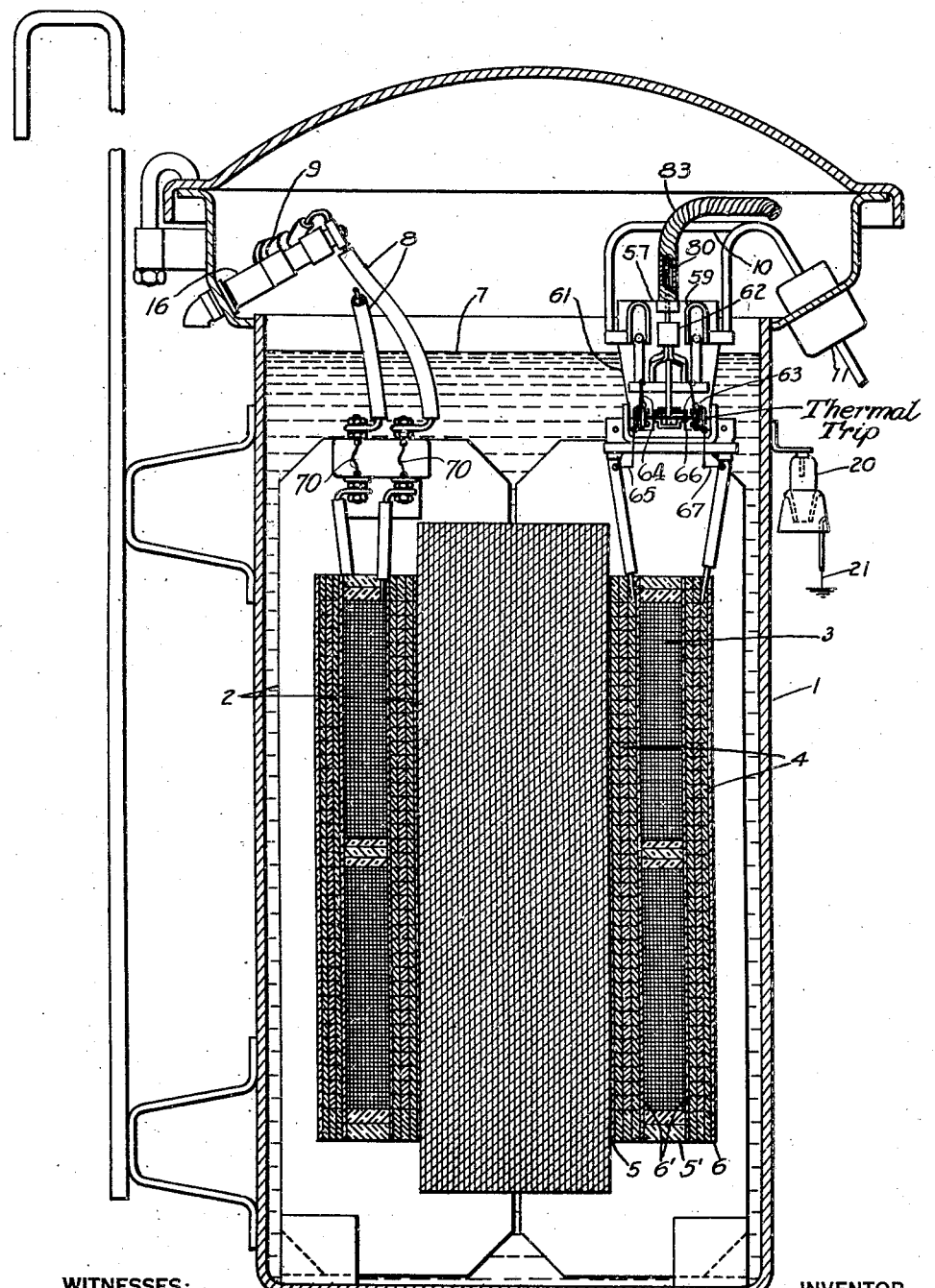
Fig. 7 is a cross-sectional view through the transformer, illustrating the installation of the thermal secondary protector therein.

My distribution transformer, in common with other distribution transformers, comprises a casing 1, a magnetizable core 2 which is in electrical contact with the casing, and insulated windings comprising a high voltage or primary winding 3 and a low-voltage or secondary winding 4, the insulation between the high-voltage winding and the casing 1 or magnetizable core 2 being indicated at 5', the insulation between the low-voltage winding and casing being indicated at 6, 6, and the insulation between the two windings being indicated at 6' (Fig. 7). The transformer casing contains oil, as indicated at 7, sufficient to cover the windings 3 and 4.

By the term "oil", wherever used throughout the specification and claims, I mean any insulating liquid which is capable of performing the functions of oil in an electric instrumentality.

The high-voltage winding is supplied with energy through high-voltage leads 8 which extend out from the casing through suitable insulating bushings 9. The low-voltage winding supplies energy to the customer's service lines through a plurality of low-voltage leads which may include two secondary phase-leads 10 extending out of the casing through insulating bushings 11, and one or more secondary neutral leads 12 extending out of the casing through insulating bushings 13. The neutral lead, or leads if there are two of them as shown in some of the figures, are usually joined together outside of the transformer tank and grounded as indicated at 14. In general, the insulation will be of different strengths on some of the windings.

In accordance with the principles of my invention, it is necessary that the flash-over values of the various bushings be coordinated with the impulse strength of the various winding-insulations to protect the insulation, so that any flash-over will occur in the bushing rather than in the insulation. It is also desirable, particularly where the customer grounds his neutral service line, to provide a preferred-path gap device of especially low-voltage disposed between the neutral lead or leads 12 and the casing 1, which may be provided by means of a little set-screw 15 in or attached to the neutral-lead bushings 13, so as to provide a discharge-gap from the casing to the neutral conductor at this point, so as to afford a preferred discharge path from the transformer-casing to the neutral lead 12, rather than to the low-voltage phase-leads 10.

In accordance with my invention, three-point protection is provided, both for the windings 3 and 4 and for the bushings 9, 11 and 13. This protection may be afforded by any means which are connected in shunt relation to the various winding-insulations and bushings, and coordinated therewith so as to break down before the protected insulation breaks down. In general, the three-point protective device includes, among other elements, an arc-quenching discharge-gap device 16 mounted inside of the transformer casing and connected between each high-voltage lead 8 and the casing, said discharge-gap device, in general, including a diffuser element 17 in which the arc is quenched and a serially connected resistor element 18.

The tank is preferably insulated from the ground, so that when a discharge occurs through the discharge device 16 the tank assumes some intermediate potential and breaks down a separate discharge-gap device 20 which is provided between the casing 1 and ground, said discharge-gap device being either an ordinary gap-device or a device of improved construction such as is described and claimed in my application entitled "Lightning-arrester discharge-gap devices", Serial No. 688,802, filed September 9, 1933. When the discharge-gap device 20 is utilized, that is, when the casing 1 is not solidly grounded, the discharge-gap device 20 is so coordinated with the neutral discharge-gap device 15 that the discharge-gap device 20 breaks down first, normally carrying the discharge from the casing to ground. The ground connection 21 of the discharge-gap device 20 may be either the same as, or separate from, the customer's ground connection 14.

Figure 1:
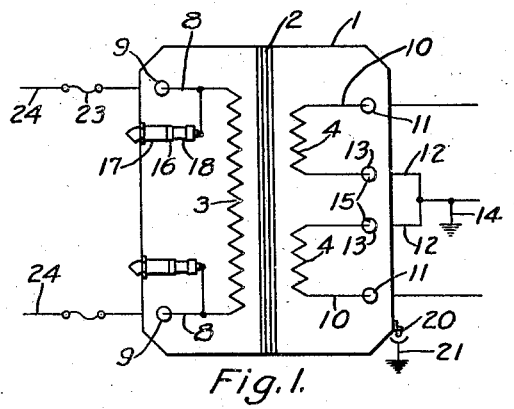
Figure 1 is a diagrammatic view of circuits and apparatus showing the first-mentioned expedient of my invention as applied to a distribution transformer, utilizing my improved diffuser and resistor with a protective shunting-gap around the resistor.

The distribution-transformer installation, in the embodiment of my invention shown in Fig. 1, is completed by a renewable external fuse cut-out 23 which is connected in series with the high-voltage leads 8 externally of the transformer-casing, and which serves as the connecting link between the distribution transformer and the high-voltage feeder or primary distribution network 24.

Figure 2:
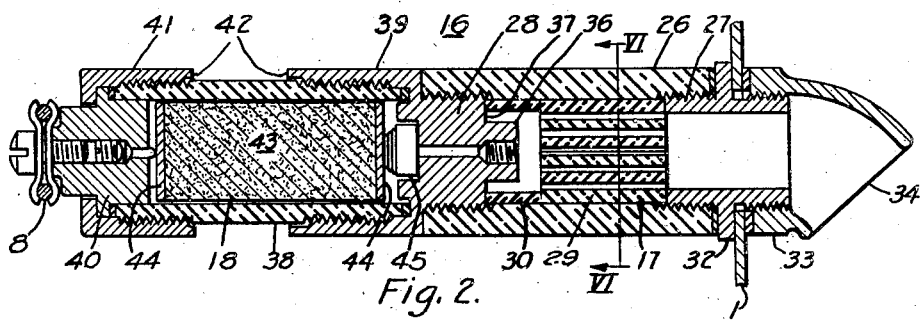
Fig. 2 is a cross-sectional view of my improved diffuser and resistor.

The combined diffuser and resistor 17 and 18, constituting the protective discharge device 16, is shown in detail in Fig. 2. The diffuser 17 comprises an enclosing tubular fibre insulating member 26 defining a diffuser chamber, terminal electrodes 27 and 28 at the respective ends of the diffuser chamber, a multi-slotted fibre diffuser element or plug 29 within said enclosing tubular fibre member 26 and having one end abutting against the terminal electrode 27, the other end being spaced from the other terminal electrode 28 by means of a separate fibre spacer-tube 30. The first-mentioned terminal electrode 27 is hollow and is provided with a centrally disposed external shoulder 32 which abuts against the inside of the transformer casing 1, the casing being bored at this point so that the end portion of the terminal member 27 extends through the casing, being held in place by means of a nut 33 which may also be provided with a downwardly sloping faucet-like discharge portion 34. The other terminal electrode 28 preferably constitutes a closed end for the diffuser chamber and is preferably faucet-like discharge portion 34. The other terrected protuberance 36 of reduced diameter, thus providing a shoulder 37 back of the protuberance, the insulating spacer-tube 30 abutting against this shoulder. The fibre element has the property, as previously noted, of evolving large quantities of substantially non-ionized gases under the influence of the direct play of an arc, so that when the discharge gap between the two terminal electrodes breaks down, the resulting arc is quickly blown out.

The resistor element 18 comprises a tubular insulating sleeve 38, preferably of fibre, with metal electrodes in the end thereof. One of the metal electrodes is integral with the terminal electrode 28 of the diffuser element, and comprises a portion 39 which is external of the resistor-enclosing sleeve 38. The other metallic electrode of the resistor element is shown as being made in two parts, namely, a plug 40 and a cap 41 which includes a portion external of the sleeve 38. The two external portions 39 and 41 constitute an external gap-device 42 which breaks down at a terminal voltage lower than the voltage at which an internal flash-over occurs inside of the insulating tube 38.

The resistance-device 18 comprises a resistor unit 43 in the form of a resistance element or rod which is prepared in rod formation from a ceramic mixture, under high pressure and high temperature. The resistance of the element 43 depends somewhat upon the primary voltage of the transformer and is such as to limit the power-follow current to a reasonable value, usually under 500 amperes, it being understood that the impedance of the external connections must be added to the resistance of the resistor element 43 in order to determine the total impedance of the discharge circuit. Five or six ohms is a suitable value for the resistor element 43 for a 2400-volt transformer. The resistor rod 43 has a negative resistance characteristic so that its resistance when carrying very heavy currents is somewhat smaller. The two ends of the resistor rod 43 are copper-coated as indicated at 44. One end of the resistor rod abuts directly against one of the terminal electrodes 40 and the other is held firmly in place by means of a spring connection 45.

The resistor-enclosing insulating sleeve 38 has a filling of an insulating flowable material such as gum, having high dielectric strength and heavy viscosity, surrounding said resistor unit 43 and completely filling said sleeve.

As previously mentioned, it is necessary for both the diffuser element 17 and the resistor element 18 to be able to withstand discharge-current surges of much more than 2,000 amperes crest value. At the time of the development of my combined resistor and diffuser of my above-mentioned patent, the maximum surge-current that could be developed in the laboratory, for test purposes, was of the order of 10,000 amperes. It was necessary therefore, to develop laboratory facilities for producing much larger surge currents. The original resistor element was not provided with the gum filling and was not provided with the external gap device 42. Careful tests indicated that it would flash-over internally, that is, inside its enclosing insulating sleeve, when carrying a surge-current of approximately 6,000 amperes with a duration of 15 micro-seconds to half value. With currents as high as 10,000 amperes, the internal stress within the insulating tube was sufficient to actually disrupt the insulating tube, and when the surge-currents were increased to something of the order of 50,000 amperes and a duration of 100 micro-seconds, the resistor casing was blown up with sufficient force to blow the cover from the transformer, thus simulating conditions which were obtained in a few instances in actual service.

From these tests it was learned that the flash-over took place along the surface of the resistance rod, and apparently no simple change which could be effected would materially increase the current-carrying ability without flash-over. Consequently, tests were undertaken to determine what could be accomplished with fillings of various insulators such as vaseline, oil and various waxes. Repeated tests showed that a much higher initial internal break-down voltage could be obtained by this method. I reached the conclusion that it would be desirable to utilize a filling material which had a relatively heavy viscosity, so that it would not materially impregnate the resistor rod.

By the foregoing means I have been able to improve the internal flash-over point of the resistance rod from 6,000 amperes as mentioned above, to approximately 25,000 amperes, the duration to half value being about 15 micro-seconds.

The construction of the resistor-element housing was then modified to provide the electrode portions 39, 41, or their equivalent, at each end of the resistance element, so as to provide the external gap 42 which would make the resistor element have a lower flash-over potential on the outside than on the inside. With this arrangement the flash-over on the outside would occur with a surge-current of approximately 12,000 amperes, or about one-half of the surge-current required to produce internal flash-over, thus providing a factor of safety of approximately 2 to 1 against the possibility of internal flash-over.

The external flash-over path of the resistance element is desirable because, when the flash-over occurs inside the insulating tubular casing of the resistor element, the restricted place between the resistor rod and the wall of the tube results in a high arc voltage and consequently greater energy-dissipation for a given surge-current. This energy-dissipation has been found, as above noted, to be sufficient not only to blow up the casing of the resistance rod, but actually, in some instances, to blow the cover off the transformer. When the flash-over takes place outside of the resistance-enclosing tube 38, the arc is unrestricted so that the arc voltage is therefore very low, with the result that only a small amount of energy is dissipated, and the danger of the cover being blown off from the transformer is minimized.

One might consider that the external flashover of the resistor element, under high current-discharge conditions would be undesirable, particularly since the element is mounted in the transformer in the space above the oil. Experience both in the field and in the laboratory indicates, however, that there is no hazard connected with this arrangement. Oil vapors from the transformer oil are not explosive. They can be made to burn when raised to a sufficiently high temperature, but they cannot be exploded as the result of a spark. The only condition under which an explosive mixture has been known to occur in a transformer has come about from a failure of the winding under the oil, resulting in a stewing arc which "cracks" or breaks down the oil, giving off both hydrogen and acetylene gas. These gases mixed with air, are explosive over a wide range of relative proportions of the mixture.

In a transformer protected with my three-point method of protection, the chances of a winding-failure are eliminated, since the voltage permitted on the winding by the protective devices are only of the order of 50% of the insulation-strength of the winding. Hence there is no possibility of a stewing arc under the oil, which would produce an explosive mixture.

I have conducted experiments in the laboratory in which the oil of the transformer has been heated to the point where the space above it was filled with oil vapor. Arcs discharged in this space under this condition would not produce an internal explosion. The reason for this is that the oil-vapor coming in contact with the arc would be practically broken down and oxidized, at the same time preventing an accumulation of hydrogen or acetylene in the air-space above the oil.

Repeated tests in the laboratory, on transformers equipped with these improved gaps, have been made. Surges as high as 50,000 amperes have been applied, flashing externally over the resistance rod and discharging through the diffuser without producing noticeable carbonization or even the slightest internal damage to the transformer. Burning at the electrodes is so slight as to be entirely un-noticeable except on the closest examination, due to the extreme rapidity with which the diffuser limits and quenches the dynamic follow-current.

In order to obtain sufficient current-carrying capacity in the discharge device as a whole, I found it necessary or desirable to make certain changes also in the diffuser element, although this element, as originally constructed, came nearer to meeting my requirements than the original resistor element shown in my aforementioned patent. I found it desirable to modify the solid electrode 28 by providing the protuberance 36 of reduced diameter, as above described, so as to direct the flash-over through the slots in the diffuser 29, in an effort to prevent the arc from passing through the outer space between the diffuser and the inside inner walls of the enclosing fibre tube 26. It was found that when the discharge was permitted to pass in this outer space, the enclosing tubular member 26 would occasionally be ruptured. To the same end, I found it desirable to utilize the separate fibre spacer-tube 38 which fitted closely against the inner walls of the outer enclosing tube 26 and which extended far enough back of the arcing surface of the protuberance so that the arc would always be inside of the spacer-tube 38 rather than outside.

It is desirable to utilize a separate spacer-tube 38, rather than an integral-shoulder outer-tube construction because such an integral fibre tube-construction would necessitate a machining operation inside the tube in order to produce the shoulder which is now formed by the spacer-tube 38, and this machining operation would not only be costly and wasteful of material, but it would also result in a much weaker mechanical construction, because experience teaches that the fibre tube owes most of its mechanical strength to the material lying closest to the inner walls thereof, so that the removal of this material by the machining operation would weaken the tube disproportionately.

The spacer-tube 38 provides a space between the end of the slotted diffuser element 29 and the terminal electrode 28, so that the ionization produced by an arc-discharge in any one of the slots of the diffuser element 29 can enter this space and thus initiate an arc discharge in the other slots of the diffuser element, so that the total discharge will not be limited to a single slot, as pointed out more fully in a patent to W. G. Roman, 1,923,748, patented August 22, 1933.

The operation of my protected distribution transformer as shown in Fig. 1 is as follows:

In the case of a small surge-current, illustrating a condition resulting from a travelling wave entering the transformer from the feeder 24, it may be assumed that a surge-current of 2000 amperes enters one or both of the high-voltage leads 8 of the transformer and penetrates the high-voltage winding 3 until the voltage on the high-voltage lead or leads reaches the flash-over value of the protective gap-device or diffuser 16. The surge-current, passing through the resistor-element 18, will be of sufficiently small magnitude so that neither an internal nor external flash-over of the resistor element will take place. The discharge of the protective gap-device 16 places a charge on the tank or casing 1 of the transformer, thus raising its potential and immediately causing a flash-over of the discharge gap 20 which thus discharges the surge to ground.

In most cases, the discharge of the high-voltage protective gap device 16 will take place at such portion of the voltage-wave that a power arc will follow the discharge. The lightning surge-discharge occurs in a few micro-seconds, of the order of from 5 to 50. The power current which follows the surge is limited in magnitude by the resistance of the resistance rod 43 of the resistance element 18 and by the impedance of the external circuit, and it is quenched by the operation of the diffuser at the first current-zero. The operation under these conditions is identical with that of the original protective gap-device of my Patent No. 1,923,727.

In the case of a very heavy surge-current, illustrating a condition resulting from a direct or near-direct lightning stroke to the high-voltage line close to the transformer, when a surge of this type enters the high-voltage lead of the transformer, it results in a discharge across the protective gap-device 16 as before mentioned. However, as the surge current builds up in the resistance rod 43 of the resistance device 18, the IR drop across the resistance rod increases to the point where a flash-over will occur on the outside of the resistor-enclosing tube 38, across the gap 42 between the external portions 39, 41 of the terminal electrodes which are in contact with the ends of the resistance rod. After this takes place, the path of the discharge is then through the arc on the outside of the protective gap device 16, to the center terminal-electrode 28, and then through the diffuser.

Under this condition it might be expected that a very heavy dynamic current would flow until the first current-zero is reached, because the resistor element has been shunted out of the circuit; but I have found that this is not the case. When the diffuser-gap is discharging high surge-currents, large quantities of un-ionized gas are present in the diffuser element. This produces a very high pressure, which increases the arc-voltage in the diffuser to such an extent that the dynamic power current is almost immediately quenched. Oscillograms show that the dynamic follow-current under these conditions is extinguished in a small fraction of a cycle.

In case a surge should originate on the low-voltage service lines which are connected to the secondary side of the transformer, a part of the surge will, of course, flow into the customer's ground, while the other part will approach the transformer, flush-over the coordinated low-voltage bushings 11 to the tank, and be discharged to ground through the discharge gap 20. The high-voltage primary winding will not be involved, unless, as often happens, a surge of the same magnitude is induced in the high-voltage leads at the same time by the same lightning stroke. The low voltage of the service line, on the secondary side, will be insufficient to sustain a power follow-current.

It is clear that, with the voltage limited between the high-voltage winding and the core or casing, by means of the coordinated diffuser or protective-gap device 16, and with the voltage limited between the low-voltage winding and the core or casing by means of the coordinated bushing-discharge devices 11 and 13 and the coordinated tank-discharge device 20, the maximum voltage between the two windings themselves will also be limited by the two coordinated protective discharge devices in series. Thus definite and positive protection is provided for each of the three insulations, and hence the name, three-point protection.

When I refer to protective discharge-gap devices I mean to include any device which performs the function of a self-quenching arc gap, that is, any device which has the property of quickly changing from substantially an insulator to a reasonably good conductor upon the occurrence of an excess-voltage surge, and quickly returning to the condition of being substantially an insulator upon the restoration of normal voltage conditions.

Figure 3:
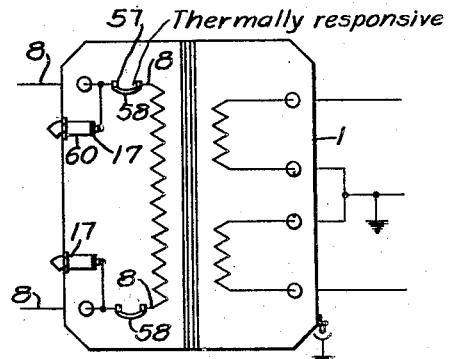
Fig. 3 is a similar view of a transformer in which the primary fuse is omitted and replaced by a circuit breaker within the transformer in the primary leads thereof, the three-point protection being afforded by a diffuser without resistor.
Figures 4, 5, 6:
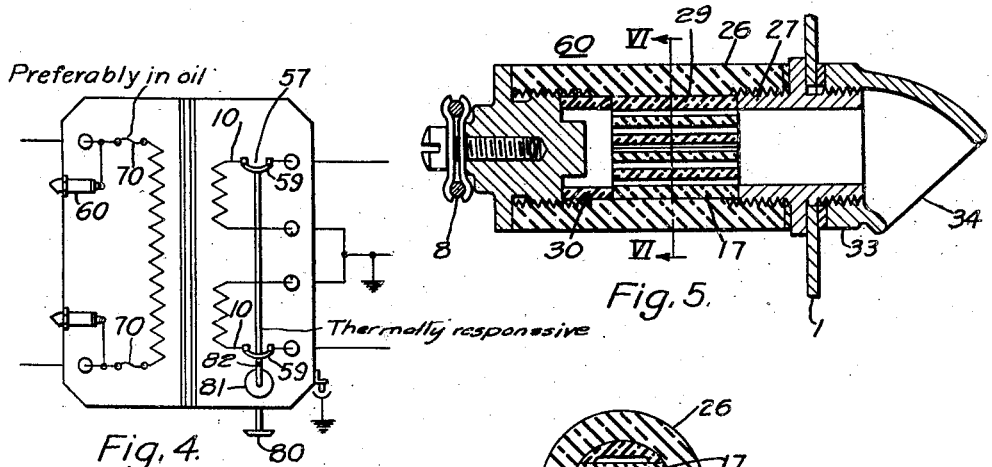
Fig. 4 is a view similar to Fig. 3, but including a thermal overload protector in the secondary leads inside of the transformer, with a manual reclosing means operable from the outside of the transformer-casing, the three-point protection being afforded by means of a diffuser without a resistor.
Fig. 5 is a cross-sectional view of the diffuser without the resistor, as shown in Figs. 3 and 4.
Fig. 6 is a cross-sectional view through the diffuser of either Fig. 2 or Fig. 5, the section-plane being indicated by the line VI—VI.
Figure 8:
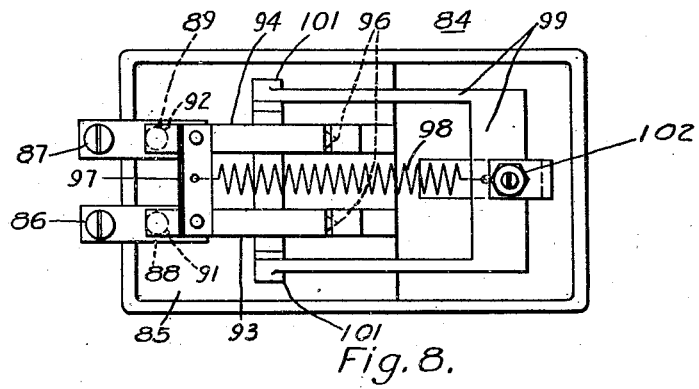
Fig. 8 is a plan view of an automatically reclosing thermal circuit breaker used in my invention, the cover being removed.

In Figs. 3 and 4 I have shown thermally responsive circuit breakers 57 mounted inside the transformer casing 1, the details of the circuit breaker being shown in Figs. 7 and 8. In Fig. 3, the circuit-breaker contacts 58 are connected in the high-voltage leads 8 of the transformer, and in Figs. 4 and 7, the circuit-breaker contacts 59 are connected in the low-voltage phase-leads 10 of the transformer.

In the embodiment shown in Fig. 3, a protective gap-device 60 is utilized, having only the diffuser element 17 as illustrated in Fig. 5. The circuit-breaker contacts 58 are connected inside of the connections to the protective gap-device 60, so that a high-voltage surge entering the transformer over one of the high-voltage leads 8, will be by-passed into the protective gap-device 60 and thus conducted to ground without passing through the circuit breaker 57. By reason of the use of the high-voltage circuit breaker 57 it is unnecessary to utilize the external high-voltage fuse cut-out 23 of Fig. 1, and it will be observed that this element is lacking in Fig. 3. The circuit breaker 57 (except for the voltage and current ratings) is or may be identical or similar in construction to that which is shown in Figs. 4 and 7, which will be described more in detail hereinafter, in connection with said figures.

In Figs. 4 and 7, I have illustrated a low-voltage circuit-breaker 57 which represents what is probably a preferred embodiment of my invention. As shown in Fig. 7, the circuit breaker is a thermal overload protector comprising an integral or self-contained unit which is mounted on its own base 61, as an attachment within the transformer casing. It comprises contact-elements 59, tripping means 62 therefor, and a thermal element or elements 63 which are mounted underneath the contact elements 59 and mechanically connected to the tripping means 62 so as to open said contact elements in response to predetermined temperature conditions. The overload protector is mounted within the transformer casing 1 so that at least its lower portion is immersed in the transformer oil 7, so that the thermal elements 63 normally have substantially the same temperature as the oil.

The contact-elements 59 of the circuit-breaker 57 may be disposed either under the oil or in the air space over the oil. In general, I expect to mount the breaker so that it is entirely submerged in the oil in the transformer-tank. In the smaller-size transformers, such as that shown in Fig. 7, this is not practical, and incidentally, it is not necessary because of the small values of current to be handled in the event of a short-circuit on the customer's service lines. The use of air-break contacts above the oil is advantageous, also, in avoiding the sludging which might be produced by breaking the contacts under the oil.

The thermal overload protector or circuit-breaker 57 is also provided with current-responsive means for quickly actuating the tripping means 62 independently of the oil-temperature in the event of an extreme over-current. This current-responsive means may be either electromagnetic or associated with the thermal element 63. Preferably, the whole or a portion of the current which passes through the contacts 59 is also passed through the thermal elements 63 as indicated by the connections 64—65 and 66—67 in Fig. 7. The design is such that, for ordinary loads and even for overloads which may run up to 1½ to 3 times the normal load, the temperature of the thermal element 63 is determined substantially by the temperature of the oil, whereas, for the extreme over-current conditions which exist when there is a short-circuit on the secondary leads, said currents being of the order of 10 to 40 times the normal load current, the temperature of the thermal element 63 is dependent mainly upon the current which is passing through it, and is largely independent of the oil-temperature.

This is a new principle in distribution-transformer installations.

Circuit breakers have been known before, in which a thermal element is heated by the current, so that a circuit-interrupting operation will be obtained quickly in the case of very great overloads, and more slowly in the case of small overloads, but the response in any event has been determined by the heating effect of the overcurrent. Such circuit-breakers have been used in a few instances in the customer's service-lines externally of a distribution transformer, and they have been found to cause more, rather than fewer, service-interruptions, because they would trip on overloads.

It should be emphasized that most utility-engineers do not desire overload protection on distribution transformers. They would rather burn up a transformer than have a service interruption due to overload. This is why transformers are fused today only against short-circuits and not against overloads.

In my device, the design is such that, for the relatively small over-currents which accompany a mere overload on the transformer, the heating effect of the thermal element is substantially not affected at all by the heating effect of the current passing through it, but is dependent principally upon the temperature of the oil in the transformer. In this way, the transformer does not trip out on overload until, upon continued or frequently repeated overloads, the transformer has overheated to such a point that any further overheating would result in the jeopardy of a burnout, or failure of the winding-insulation.

Thus, my internally mounted thermally responsive circuit-breaker does not trip out on overload. It only protects the transformer against burnout. My transformer, when overloaded to the burnout point, comes off the line just under the burnout point, and can therefore be put back in service on a smaller load at some other location, without expense for repairs.

However, under the extreme overcurrent conditions corresponding to a short-circuit on the customer's service lines, the heating-effects of the current passing through the thermal element will so largely over-mask the temperature-controlling effect of the oil in which the thermal element is immersed, that the thermal element will be rapidly or substantially instantly heated to the predetermined temperature-condition at which it will trip the tripping-mechanism 62 of the circuit breaker.

Referring again to the diagram shown in Fig. 4, it will be observed that the low-voltage thermal protector 57 protects the transformer against the possibility of failure from prolonged overloads, as well as from a dead short-circuit on the customer's service lines, so that there is no need to have an external primary fuse in order to afford either one of these protective measures. The only other way in which the transformer can fail is by reason of an inherent manufacturing defect in the winding itself, as the design of the insulation is such that it is able to withstand much higher voltage-impulses than the voltages necessary to flash over the protective-gap devices afforded with my three-point protective means.

It may be desirable, therefore, not to utilize an external primary-circuit fuse at all, and this being the case, it is not necessary to utilize the resistance element 18 in connection with the protective device 16 as in Fig. 1. Accordingly, in the embodiment of my invention shown in Fig. 4, as well as in that shown in Fig. 3, a protective device 66 is illustrated as comprising only the diffuser 17. This diffuser is shown in detail in Fig. 5, being similar to the diffuser element shown in Fig. 3, and being similar in principle to the diffuser element shown in my aforementioned patent, without the resistor element at all, substantially resistanceless or low-resistance connections being utilized to connect the terminal electrodes of the diffuser to the high-voltage lead 8 and to the transformer casing 2, respectively.

In accordance with my invention as shown in Fig. 4, that is, in regard to a distribution transformer with the thermal protective device in the low-voltage leads and the complete three-point protection against excess-voltage surges, attention should be directed to the fact that it is not necessary, even in the most conservative of installations, to provide a renewable high-voltage fuse cut-out protector, such as the ordinary design of an external fuse cut-out 23 as in Fig. 1. In the design shown in Fig. 4, if a high-voltage fuse is used at all, a blowing of the fuse means that the transformer has been burned out due to an internal fault. Thus the transformer must be replaced, and there is no point in having a renewable or refillable or reclosing high-voltage fuse or circuit-interrupting device in the primary leads. Therefore, much of the elaboration of the standard fuse cut-out is eliminated, since any primary fuse-link which would be utilized would not have to perform the functions of a switch and would not have to be refilled.

Figure 10:
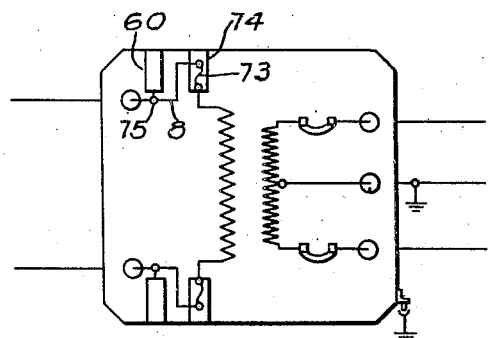
Fig. 10 is a diagrammatic view illustrating a form of embodiment of primary fuses mounted inside of the transformer-casing.

The foregoing considerations make it possible, therefore, to place the high-voltage fuse, if one must be used at all, inside of the transformer tank or casing 1, which has not heretofore been practicable because of the requirements for refilling or renewing the fuses. In Figs. 4 and 10, I have illustrated two different ways in which the primary-lead fuses might be put inside of the tank in a transformer which is protected by my low-voltage thermal protector and by my completely protective three-point protection device.

In Fig. 4, the fuse 78 is mounted at the high-tension terminal-board of the transformer winding, being placed directly in the oil, being simply immersed under the oil, without any discharge to the outside. My experiments indicate that this disposition of the high-voltage fuse will work quite satisfactorily, and it constitutes the simplest means which I know of for mounting the fuse.

In Fig. 10, the fuse 73 is mounted within a fibre tube 74 which is vented outside of the transformer tank, the fuse being connected in the primary leads 8 inside of the point of connection 75 with the diffuser element 66 which constitutes the protective gap-device for discharging excess-voltage surges from the incoming high-voltage leads 8.

I desire to emphasize, in connection with Figs. 4 and 10, that the high-tension fuses 78 and 73 are not traversed by the discharge currents, so that the fuse link, regardless of its size, will not be blown by the surge-currents or by the power-follow currents which may follow the surge-discharge. The second point to be emphasized is that these fuses can open only as a result of an internal fault in the transformer, so that there is no need for providing any means for refilling or replacing them.

In the minds of some customer engineers, the question of reclosing the thermal protector device or circuit-breaker 57, in the event that it has tripped as a result of a dead short-circuit on the customer's supply lines, is a question of some importance. It is not necessary to consider the reclosure of the circuit-breaker or thermal interrupter if it has tripped as a result of a long-continued overload, resulting in dangerous overheating of the transformer, because in that case the transformer would simply be replaced, as an entirety, by another transformer of larger capacity. In quite a number of cases, however, it is probable that the service lines would develop a short-circuit as a result of swinging together in the wind, or being torn down by a tree falling on them, or as a result of a fault developing in the conduit of the customer's service lines. Troubles of this sort have occurred quite frequently. In such cases it is necessary for the lineman to reset the breaker, after having corrected the fault, and there is no point to taking the transformer down and installing a larger size.

For the reasons just outlined, the circuit-breaker or thermal protector 57 will preferably be provided with either a manual resetting device or an automatic resetting device, or both.

In Fig. 4, a manual resetting and reclosing device is schematically indicated at 80, as comprising an operating handle mounted on the end of a wire or rod or any other desired resetting and reclosing mechanism, which may pass through a bushing 81, which need not necessarily be an insulating bushing if an insulating connection is utilized inside of the tank or casing, as indicated at 82. The details of this manual reclosing means are not important, as any suitable means to that end will suffice.

In Fig. 7, the manual resetting and reclosing device is illustrated as a wire 80 which is enclosed in a flexible tube 83.

The tripping means 62 (Fig. 7) of the circuit-breaker 57 are so arranged that it is impossible for the contacts 59 to remain closed when the thermal element 69 is overheated.

The general construction of the circuit breaker 57, as shown in Fig. 7, is shown and claimed in an application of Hiller D. Dorfman, Serial No. 480,096, filed September 6, 1930, patented July 10, 1934, No. 1,966,286, and assigned to the Westinghouse Electric & Manufacturing Company.

Figure 9:
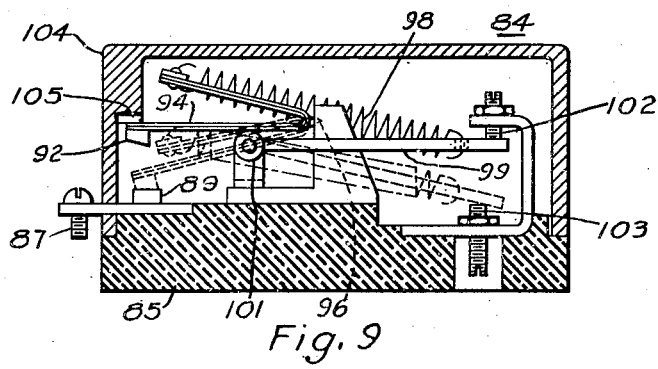
Fig. 9 is a vertical sectional view of the same.

Figs. 8 and 9 show a simple type of automatically reclosing thermal circuit breaker 84 which can be substituted for the circuit breaker 57 in any of the other figures of the drawings, and which constitutes the subject matter of an application of Oliver S. Jennings, Serial No. 705,071, filed January 3, 1934 and assigned to the Westinghouse Electric & Manufacturing Company. This circuit breaker will be immersed in the oil of the transformer tank, and comprises a base 85 carrying a pair of terminal members 86 and 87, which are connected in series with one of the leads of the transformer. The terminals 86 and 87 carry stationary contact members 88 and 89, respectively, which respectively cooperate with two movable contact members 91 and 92, which are respectively carried by two bimetallic elements 93 and 94. These elements 93 and 94 are shown as being bent in U-shape, as shown in Fig. 9, being pivoted at the bight of the U to a stationary support carried by the base, as indicated at 96. The ends of the bimetallic elements 93 and 94, opposite to the movable contact elements 91 and 92, are connected together by a metal jumper 97, so that when the contacts are closed, the current flows from one terminal 86, through the bimetallic element 93, the jumper 97, and the second bimetallic element 94, to the other terminal 87.

The jumper 97 is connected to the left-hand end of an operating spring 98, the other end of which is connected to a pivoted piece 99, which is pivoted on the base 85, as indicated at 101, and which moves between upper and lower stop members 102 and 103, respectively. The circuit breaker is provided with a cover 104 which is so shaped as to provide a stop or shoulder 105 which limits the upward movement of the contact-bearing ends of the bimetallic elements 93 and 94, so as to limit the opening between the stationary and movable contacts 88—91 and 89—92.

The method of operation of the automatic reclosing thermal circuit breaker 84 shown in Figs. 8 and 9 is as follows. The device is normally closed, as indicated in dotted lines in Fig. 9. Under these circumstances, the current passes through the bimetallic elements 93 and 94 tending to heat the same. These elements, being immersed in the transformer oil, have their temperature largely determined by the temperature of the oil, as previously explained in connection with the circuit breaker 57, except upon extreme over-current conditions, in which case the heat due to the current will cause the bimetallic elements to heat quickly, regardless of the oil temperature.

If the bimetallic elements over-heat, either due to a gradual heating of the transformer oil as the result of a sustained over-load condition, or as a result of a sudden extreme over-current caused by a short-circuit in the secondary lines, the bimetallic elements open out sufficiently to raise the left-hand end of the spring 97, which they carry, high enough so that the axis of the spring comes above the pivot-point 101 of the pivoted member 99, thereby raising the latter to its upper position against the top stop 102, as shown in full lines in Fig. 9. This latter movement raises the right-hand end of the spring 98 so that the axis of the spring comes above the pivot-point 96 of the bimetallic elements, causing the contacts to move to their upper position and open the circuit, as indicated in full lines in Fig. 9.

As the bimetallic elements 93 and 94 cool, they will decrease their spread, lowering the left-hand end of the spring 98 until the axis of the spring finally comes below the pivot-point 96 of the bimetallic elements, whereupon the bimetallic elements will be drawn down into closed position, closing the contacts 88—91 and 89—92, respectively. This movement brings the center-line of the spring below the pivot-point 101 of the pivoted member 99, drawing the latter down against its bottom stop 103, as indicated in dotted lines in Fig. 9.

With the automatic reclosing means shown in Figs. 8 and 9, it will be observed that if the circuit-breaker trips out, as the result of a momentary short-circuit on the customer's service lines, the transformer-oil does not rise in temperature, and the thermal elements 93 and 94 which are heated almost instantly to the point where the breaker opens, are readily cooled in a few seconds by the transformer-oil. By providing a breaker which automatically resets and recloses as the thermal element cools down, it is obvious that this operation will take place in a few moments after the tripping-out under short-circuit, which is a thing much to be desired. In case of a self-clearing short-circuit which exists only momentarily, only a momentary service interruption will result, therefore, to the customer. In case of a permanent or steady short-circuit, the transformer will flash on and off until the oil becomes sufficiently overheated, or until a suitable counting device (not shown) of a type familiar in the field of reclosing circuit-breakers, has operated to cut out the reclosing mechanism.

However, if the breaker trips out as a result of a sustained overload which has produced a dangerously high oil-temperature, it will be many hours before the oil would cool down sufficiently to actuate the resetting and reclosing mechanism, and during the interim the service interruption would be reported to the power company, which would investigate and find the overloaded condition. It is apparent, therefore, that my limited or thermal automatic resetting and reclosing feature is extremely desirable and useful in connection with a combined thermal and over-current-responsive circuit-breaker or protective device mounted in the transformer tank and having its thermal elements normally responsive to the oil-temperature.

In the design of the thermal protector or circuit-breaker, either in the form shown at 57 or in that shown at 84, it is desirable to make the design so that the temperature-gradient between the bimetallic or thermal element and the oil is approximately the same as the temperature-gradient between the copper conductors of the transformer-winding and the oil, so that the thermal element follows the temperature of the transformer-winding and interrupts the circuit at a temperature which will prevent damage to the transformer-insulation.

In view of the foregoing description of my invention and explanation of its operation and significance in the art to which it relates, it should be clear that there is a great deal more to my invention than merely an aggregation of lightning arresters and fuses and circuit-breakers with a distribution transformer. Indeed, if that were all, most operating engineers would probably favor the present location of lightning arresters and fuses and circuit-breakers, outside of the transformer tank. But this is not all. I have provided a distribution transformer which is truly surge-proof and outage-proof. It is my answer to the demand of the industry for a better product.

The many operating engineers, or customer engineers, whose combined voice registers the demand of the industry, have been far from unanimous in their ideas as to how the results aimed at by my invention should be accomplished. Some have urged stud-bushings, with exposed terminals, and coordinated insulation, as the best solution to the difficulties from lightning. My analysis has showed that the use of these expedients is unsound because, among other things, they afford no solution to the serious problem of primary fuse-outages, which are not prevented at all by such expedients.

Other engineers have felt that the solution in their difficulties lay in the direction of increased insulation, with correspondingly increased impulse-voltage strength. Here again my analysis has shown that the small improvement in ability to withstand surges, which could be brought about by this method, would not be worth the extra cost, and many of the important engineering problems would still remain unsolved.

The transformer manufacturer faces a serious problem in attempting to meet these conflicting demands of the trade and still retain a reasonable degree of standardization as a basis for economical manufacture.

I have given consideration to these problems, and have developed a single product which co-ordinates conflicting ideas and meets the needs of the industry. It gives perfect protection, independent of any ground resistances and at the lowest initial cost. It is universal in application, for the city, for the country, for any type of distribution system, for any system of transformer connections, either single-phase or multiphase, and for any grounding practice, either with the transformer-tank grounded or with the transformer-tank connected to ground through a discharge gap, or with the customer's neutral either grounded or ungrounded.

It will be understood, from the foregoing, that I have provided, in a single unit, a standard transformer-installation which is completely and perfectly protected against all possible contingencies, and which represents a very remarkable and very important departure from the standard practices of the art which were in existence prior to my invention.

My excess-voltage protective device, as shown in Figs. 1 and 2, constitutes the subject-matter of a divisional application, Serial No. 748,860, filed October 18, 1934.

While I have illustrated my invention in several preferred embodiments, it will be evident that many modifications and changes may be made by those skilled in the art without departing from the essential principles and purposes of my invention. I desire, therefore, that the appended claims shall be accorded the broadest interpretation consistent with their language and the prior art.

I claim as my invention:

1. In an electrical transformer comprising irsulated high-voltage windings, insulated low voltage windings, a conducting casing, insulating high-voltage and low-voltage bushings, one or more high-voltage leads connected to said high-voltage windings and passing out of the casing through said high-voltage bushings, at least one of said high-voltage leads being exposed to excess-voltage surges, one or more low-voltage leads connected to said low-voltage windings and passing out of the casing through said low-voltage bushings; the combination, with said transformer, of excess-voltage means associated, at least with said exposed high-voltage lead, for providing an excess-voltage discharge from said lead in response to a predetermined voltage-increase over normal, said excess-voltage means also inherently operating, in response to a subsequent reduction in voltage, to substantially cut off said discharge promptly upon the return of normal voltage-conditions on said lead, and said excess-voltage means being of such capacity as to provide a discharge-path for surge-currents of such magnitude and duration that their fuse-rupturing ability is in excess of the fuse-rupturing ability of the currents produced in said protected lead upon the occurrence of a short-circuit on the low-voltage leads of said transformer; and means, in at least one of the low-voltage leads of the transformer, for automatically open-circuiting said lead in response to a short-circuit thereon, and for automatically open-circuiting said lead also in response to high-internal-temperature conditions which are only slightly lower than a burn-out-producing condition of said transformer; said high-voltage leads including a fusible link not traversed by said surge discharges and having a capacity suitable for affording protection only against the possibility of an internal fault in the primary winding, said fusible link having sufficient electrical resistance to cause it to be electrically heated to a fusing temperature which is materially in excess of the temperature of the ambient medium surrounding the link, upon the occurrence of excessive current-flow of predetermined magnitude.

2. In an electrical transformer comprising insulated high-voltage windings, insulated low-voltage windings, a conducting casing, insulating high-voltage and low-voltage bushings, one or more high-voltage leads connected to said high-voltage windings and passing out of the casing through said high-voltage bushings, at least one of said high-voltage leads being exposed to excess-voltage surges, one or more low-voltage leads connected to said low-voltage windings and passing out of the casing through said low-voltage bushings; the combination, with said transformer, of excess-voltage means associated, at least with said exposed high voltage lead, for providing an excess-voltage discharge from said lead in response to a predetermined voltage-increase over normal, said excess-voltage means also inherently operating, in response to a subsequent reduction in voltage, to substantially cut off said discharge promptly upon the return of normal voltage-conditions on said lead, and said excess-voltage means being of such capacity as to provide a discharge-path for surge-currents of such magnitude and duration that their fuse-rupturing ability is in excess of the fuse-rupturing ability of the currents produced in said protected lead upon the occurrence of a short-circuit on the low-voltage leads of said transformer; means, in at least one of the low-voltage leads of the transformer, for automatically open-circuiting said lead in response to a short-circuit thereon; said high-voltage leads including a fusible link not traversed by said surge discharges and having a capacity suitable for affording protection only against the possibility of an internal fault in the primary windings, said fusible link having sufficient electrical resistance to cause it to be electrically heated to a fusing temperature which is materially in excess of the temperature of the ambient medium surrounding the link, upon the occurrence of excessive current-flow of predetermined magnitude.

3. An electric transformer adapted to energize a customer's service line from an alternating-current feeder and subject to lightning disturbances, said transformer comprising insulated windings, a conducting casing, primary and secondary leads extending out from the windings through the casing, and adapted to be connected respectively to the feeder and to the customer's service line, at least one of said primary leads being exposed to high-voltage surges, a protective excess-voltage discharge device associated, at least with said exposed primary lead, for avoiding insulation failure due to excessive voltage surges, reclosable circuit-interrupting means mounted within the transformer-casing and electrically associated with said secondary leads for protecting the transformer against external faults on the customer's service line, and a non-reclosable excess-current-responsive circuit-interrupter mounted within the transformer-casing and electrically associated with at least one of said primary leads inside of the connections of said excess-voltage discharge device, so as not to be affected by discharges in said excess-voltage discharge device, said primary-lead circuit-interrupter being operable to interrupt its circuit, in response to overcurrents of a magnitude and duration corresponding to conditions existing when there is a failure of the transformer-insulation, but not in response to overcurrents existing in said primary leads when there is a short-circuit across the customer's service line, and said excess-voltage discharge device being capable of discharging, in general, lightning surge discharges of materially more than 50,000 amperes crest value without failure of either the discharge device or the transformer-insulation.

4. An electric transformer adapted to energize a customer's service line from an alternating-current feeder and subject to lightning disturbances, said transformer comprising insulated windings, a conducting casing, primary and secondary leads extending out from the windings through the casing, and adapted to be connected respectively to the feeder and to the customer's service line, at least one of said primary leads being exposed to high-voltage surges, a protective excess-voltage discharge device associated, at least with said exposed primary lead, for avoiding insulation failure due to excessive voltage surges, thermally responsive circuit-interrupting means mounted within the transformer-casing and electrically associated with said secondary leads for protecting the transformer against overheating, and a non-reclosable excess-current-responsive circuit-interrupter mounted within the transformer-casing and electrically associated with at least one of said primary leads inside of the connections of said excess-voltage discharge device, so as not to be affected by discharges in said excess-voltage discharge device, said primary-lead circuit-interrupter being operable to interrupt its circuit, in response to overcurrents of a magnitude and duration corresponding to conditions existing when there is a failure of the transformer-insulation, but not in response to overcurrents existing in said primary leads when there is a short-circuit across the customer's service line, and said excess-voltage discharge device being capable of discharging, in general, lightning surge discharges of materially more than 50,000 amperes crest value without failure of either the discharge device or the transformer-insulation.

5. An electric transformer adapted to energize a customer's service line from an alternating-current feeder and subject to lightning disturbances, said transformer comprising insulated windings, a conducting casing, primary and secondary leads extending out from the windings through the casing, and adapted to be connected respectively to the feeder and to the customer's service line, at least one of said primary leads being exposed to high-voltage surges, a protective excess-voltage discharge device associated, at least with said exposed primary lead, for avoiding insulation failure due to excessive voltage surges, reclosable circuit-interrupting means mounted within the transformer-casing and electrically associated with said secondary leads for protecting the transformer against external faults on the customer's service-line, and a circuit-interrupter mounted within the transformer-casing and electrically associated with at least one of said primary leads inside of the connections of said excess-voltage discharge device, so as not to be affected by discharges in said excess-voltage discharge device, said primary-lead circuit-interrupter comprising a fusible link, said fusible link having sufficient electrical resistance to cause it to be electrically heated to a fusing temperature which is materially in excess of the temperature of the ambient medium surrounding the link, upon the occurrence of excessive current-flow of predetermined magnitude.

6. An electric transformer adapted to energize a customer's service line from an alternating-current feeder and subject to lightning disturbances, said transformer comprising insulated windings, a conducting casing, primary and secondary leads extending out from the windings through the casing, and adapted to be connected respectively to the feeder and to the customer's service line, at least one of said primary leads being exposed to high-voltage surges, a protective excess-voltage discharge device associated, at least with said exposed primary lead, for avoiding insulation failure due to excessive voltage surges, thermally responsive circuit-interrupting means mounted within the transformer-casing and electrically associated with said secondary leads for protecting the transformer against overheating, and a circuit-interrupter mounted within the transformer-casing and electrically associated with at least one of said primary leads inside of the connections of said excess-voltage discharge device, so as not to be affected by discharges in said excess-voltage discharge device, said primary-lead circuit-interrupted comprising a fusible link, said fusible link having sufficient electrical resistance to cause it to be electrically heated to a fusing temperature which is materially in excess of the temperature of the ambient medium surrounding the link, upon the occurrence of excessive current-flow of predetermined magnitude.

7. In an elecrical transformer comprising insulated high-voltage windings, insulated low-voltage windings, a conducting casing, insulating high-voltage and low-voltage bushings, one or more high-voltage leads connected to said high-voltage windings and passing out of the casing through said high-voltage bushings, at least one of said high-voltage leads being exposed to excess-voltage surges, one or more low-voltage leads connected to said low-voltage windings and passing out of the casing through said low-voltage bushings; the combination, with said transformer, of excess-voltage means associated, at least with said exposed high-voltage lead, for providing an excess-voltage discharge from said lead in response to a predetermined voltage-increase over normal, said excess-voltage means also inherently operating, in response to a subsequent reduction in voltage, to substantially cut off said discharge promptly upon the return of normal voltage-conditions on said lead, and said excess-voltage means being of such capacity as to provide a discharge-path for surge-currents as high as at least about 50,000 amperes for about 100 micro-seconds to half value; a circuit-breaker mounted within the transformer-casing, in at least one of the low-voltage leads of the transformer; and a fusible link disposed in the circuit of the high-voltage windings of the transformer, within the connection of the excess-voltage means so as not to carry the excess-voltage discharge-current, said fusible link being of a capacity suitable for affording protection only against the possibility of an internal fault in the primary windings, said fusible link having sufficient electrical resistance to cause it to be electrically heated to a fusing temperature which is materially in excess of the temperature of the ambient medium surrounding the link, upon the occurrence of excessive current-flow of predetermined magnitude.

8. In an electrical transformer comprising insulated high-voltage windings, insulated low-voltage windings, a conducting casing, insulating high-voltage and low-voltage bushings, one or more high-voltage leads connected to said high-voltage windings and passing out of the casing through said high-voltage bushings, at least one of said high-voltage leads being exposed to excess-voltage surges, one or more low-voltage leads connected to said low-voltage windings and passing out of the casing through said low-voltage bushings; the combination, with said transformer, of excess-voltage means mounted within the transformer-casing and associated, at least with said exposed high-voltage lead, for providing an excess-voltage discharge from said lead in response to a predetermined voltage-increase over normal, said excess-voltage means also inherently operating, in response to a subsequent reduction in voltage, to substantially cut off said discharge promptly upon the return of normal voltage-conditions on said lead, and said excess-voltage means being of such capacity as to provide a discharge-path for surge-currents of such magnitude and duration that their fuse-rupturing ability is in excess of the fuse-rupturing ability of the currents produced in said protected lead upon the occurrence of a short-circuit on the low-voltage leads of said transformer; circuit-interrupter means mounted within the transformer-casing, in at least one of the low-voltage leads of the transformer, for automatically open-circuiting said lead in response to a short-circuit thereon, and for automatically open-circuiting said lead also in response to high-internal-temperature conditions which are only slightly lower than a burn-out-producing condition of said transformer; and a fusible link disposed in the circuit of the high-voltage windings within the transformer-casing, within the connection of the excess-voltage means so as not to carry the excess-voltage discharge-current, said fusible link being of a capacity suitable for affording protection only against the possibility of an internal fault in the primary windings, said fusible link having sufficient electrical resistance to cause it to be electrically heated to a fusing temperature which is materialy in excess of the temperature of the ambient medium surrounding the link, upon the occurrence of excessive current-flow of predetermined magnitude.

9. In an electrical transformer comprising insulated high-voltage windings, insulated low-voltage windings, a conducting casing, insulating high-voltage and low-voltage bushings, one or more high-voltage leads connected to said high-voltage windings and passing out of the casing through said high-voltage bushings, at least one of said high-voltage leads being exposed to excess-voltage surges, one or more low-voltage leads connected to said low-voltage windings and passing out of the casing through said low-voltage bushings; the combination, with said transformer, of excess-voltage means associated, at least with said exposed high-voltage lead, for providing an excess-voltage discharge from said lead in response to a predetermined voltage-increase over normal, said excess-voltage means also inherently operating, in response to a subsequent reduction in voltage, to substantially cut off said discharge promptly upon the return of normal voltage-conditions on said lead, and said excess-voltage means being of such capacity as to provide a discharge-path for surge-currents of such magnitude and duration that their fuse-rupturing ability is in excess of the fuse-rupturing ability of the currents produced in said protected lead upon the occurrence of a short-circuit on the low-voltage leads of said transformer; and means, in at least one of the leads of the transformer, for automatically open-circuiting said lead in response to currents of a magnitude corresponding to those produced in said lead upon the occurrence of a short-circuit on the low-voltage leads of the transformer, and for automatically open-circuiting said lead also in response to high-internal-temperature conditions which are only slightly lower than a burn-out-producing condition of said transformer.

10. In an electrical transformer comprising insulated high-voltage windings, insulated low-voltage windings, a conducting casing, insulating oil in the casing, insulating high-voltage and low-voltage bushings, one or more high-voltage leads connected to said high-voltage windings and passing out of the casing through said high-voltage bushings, at least one of said high-voltage leads being exposed to excess-voltage surges, one or more low-voltage leads connected to said low-voltage windings and passing out of the casing through said low-voltage bushings; the combination, with said transformer, of excess-voltage means associated, at least with said exposed high-voltage lead, for providing an excess-voltage discharge from said lead in response to a predetermined voltage-increase over normal, said excess-voltage means also inherently operating, in response to a subsequent reduction in voltage, to substantially cut off said discharge promptly upon the return of normal voltage-conditions on said lead, and said excess-voltage means being of such capacity as to provide a discharge-path for surge-currents of such magnitude and duration that their fuse-rupturing ability is in excess of the fuse-rupturing ability of the currents produced in said protected lead upon the occurrence of a short-circuit on the low-voltage leads of said transformer; and circuit-interrupter means connected in at least one of the leads of the transformer and having a thermally responsive element, a tripping mechanism responsive to said thermally responsive element, means for so mounting said thermally responsive element that it is normally responsive to the temperature of the oil in the transformer-casing, and means for also heating said thermally responsive element in response to the transformer current.

11. In an electrical transformer comprising insulated high-voltage windings, insulated low-voltage windings, a conducting casing, insulating high-voltage and low-voltage bushings, one or more high-voltage leads connected to said high-voltage windings and passing out of the casing through said high-voltage bushings, at least one of said high-voltage leads being exposed to excess-voltage surges, one or more low-voltage leads connected to said low-voltage windings and passing out of the casing through said low-voltage bushings; the combination, with said transformer, of excess-voltage means associated, at least with said exposed high-voltage lead, for providing an excess-voltage discharge from said lead in response to a predetermined voltage-increase over normal, said excess-voltage means also inherently operating, in response to a subsequent reduction in voltage, to substantially cut off said discharge promptly upon the return of normal voltage-conditions on said lead, and said excess-voltage means being of such capacity as to provide a discharge-path for surge-currents as high as at least about 50,000 amperes for about 100 micro-seconds to half value; and means, in at least one of the leads of the transformer, for automatically open-circuiting said lead in response to currents of a magnitude corresponding to those produced in said lead upon the occurrence of a short-circuit on the low-voltage leads of the transformer.

12. In an electrical transformer comprising insulated high-voltage windings, insulated low-voltage windings, a conducting casing, insulating high-voltage and low-voltage bushings, one or more high-voltage leads connected to said high-voltage windings and passing out of the casing through said high-voltage bushings, at least one of said high-voltage leads being exposed to excess-voltage surges, one or more low-voltage leads connected to said low-voltage windings and passing out of the casing through said low-voltage bushings; the combination, with said transformer, of excess-voltage means associated, at least with said exposed high-voltage lead, for providing an excess-voltage discharge from said lead in response to a predetermined voltage-increase over normal, said excess-voltage means also inherently operating, in response to a subsequent reduction in voltage, to substantially cut off said discharge promptly upon the return of normal voltage-conditions on said lead, and said excess-voltage means being of such capacity as to provide a discharge-path for surge-currents as high as at least about 50,000 amperes for about 100 micro-seconds to half value; and circuit-interrupter means mounted within the transformer casing, in at least one of the leads of the transformer, for automatically open-circuiting said lead in response to currents of a magnitude corresponding to those produced in said lead upon the occurrence of a short-circuit on the low-voltage leads of the transformer, and for automatically open-circuiting said lead also in response to high-internal-temperature conditions which are only slightly lower than a burn-out-producing condition of said transformer.

13. A surge-proof transformer-installation comprising, in combination, a transformer having a conducting casing, a high-voltage winding, a low-voltage winding, insulation between each winding and the casing, and between the two windings, said insulation being of different strengths on some of said windings, oil in said transformer-casing, high-voltage and low-voltage leads extending out from the respective windings through the casing, means for providing three-point protection for the insulation between each winding and the casing, and between the two windings, said three-point protective means comprising gap devices coordinated with the several insulations to be protected whereby the respective gap devices break down and relieve the insulation of excessive voltages before the insulation breaks down, at least one of said gap devices including protective means of a type which will change from substantially a non-conductor to a voltage-limiting conductor at a predetermined excess-voltage, and which will promptly change back again from a conductor to substantially a non-conductor when an excess-voltage surge has been dissipated and the voltage returns to normal, and a circuit-interrupting device mounted within the casing and having contacts associated with at least one of said leads within said transformer and within the connections to said protective means, and tripping means for opening said contacts in response to both current and oil-temperature.

14. A surge-proof transformer-installation comprising, in combination, a transformer having a conducting casing, a high-voltage winding, a low-voltage winding, insulation between each winding and the casing, and between the two windings, said insulation being of different strengths on some of said windings, oil in said transformer-casing, high-voltage and low-voltage leads extending out from the respective windings through the casing, means for providing three-point protection for the insulation between each winding and the casing, and between the two windings, said three-point protective means comprising gap devices coordinated with the several insulations to be protected whereby the respective gap devices break down and relieve the insulation of excessive voltages before the insulation breaks down, at least one of said gap devices including protective means of a type which will change from substantially a non-conductor to a voltage-limiting conductor at a predetermined excess-voltage, and which will promptly change back again from a conductor to substantially a non-conductor when an excess-voltage surge has been dissipated and the voltage returns to normal, and a circuit-interrupting device mounted within the casing and having contacts associated with at least one of said leads within said transformer and inside of the connections to said three-point protective means, so as not to be affected by discharges in said protective means, said circuit-interrupting device comprising a thermal element in contact with, and normally responsive to the temperature of, the transformer oil, so as to normally have substantially the same temperature as the oil, and means responsive to a predetermined temperature of said thermal element for effecting an opening of said circuit-interrupter contacts.

15. A surge-proof transformer-installation comprising, in combination, a transformer having insulated windings, a conducting casing, oil in said transformer-casing, primary and secondary leads extending out from the windings through the casing, at least one of said primary leads being exposed to high-voltage surges, a protective excess-voltage discharge device associated, at least with said exposed primary lead, for avoiding insulation failure due to excessive voltage surges, a thermal overload protector comprising an integral or self-contained unit mounted as an attachment within the transformer-casing and comprising circuit-breaker contact elements, tripping means therefor, and a thermal element mechanically connected to said tripping means so as to open said contact elements in response to temperature conditions of the thermal element, and means for mounting said overload protector with at least its thermal element immersed in the transformer-oil, said overload protector having its contact elements electrically connected in series with at least one of said leads within the transformer.

16. A surge-proof transformer-installation comprising, in combination, a transformer having a conducting casing, a high-voltage winding, a low-voltage winding, insulation between each winding and the casing, and between the two windings, said insulation being of different strengths on some of said windings, high-voltage and low-voltage leads extending from the respective windings through the casing, means for providing adequate protection for the transformer-insulation, said protective means comprising gap devices coordinated with the several insulations to be protected whereby the respective gap devices break down and relieve the insulation of excessive voltages before the insulation breaks down, at least one of said gap devices including a diffuser mounted within said transformer-casing and having an enclosing tubular insulating member defining a diffuser chamber, terminal electrodes at the respective ends of said diffuser chamber, means for venting said diffuser chamber outside of the transformer casing, arc-responsive gas-evolving means in said diffuser chamber, and substantially resistanceless connections connecting the terminal electrodes of said diffuser to a high-voltage lead and to the transformer casing, respectively, and an excess-current-responsive circuit-interrupting device mounted within the transformer casing and electrically connected so as not to be affected by discharges in said gap devices and so as to afford protection at least against external short-circuits on the low-voltage leads of the transformer.

17. A surge-proof transformer-installation comprising, in combination, a transformer having insulated windings, a conducting casing, primary and secondary leads extending out from the windings through the casing, said secondary leads comprising two low-voltage phase-leads and a grounded neutral lead, at least one of said primary leads being exposed to high-voltage surges, a protective excess-voltage discharge device associated, at least with said exposed primary lead, for avoiding insulation failure due to excessive voltage surges, a protective discharge device comprising a preferred-path gap device of especially low voltage disposed between said neutral lead and said transformer-casing to afford a preferred discharge-path from said transformer-casing to said neutral lead rather than to said low-voltage phase-leads, and a circuit-interrupting device associated with said low-voltage phase-leads within said transformer.

18. A surge-proof transformer-installation comprising, in combination, a transformer having insulated windings, a conducting casing, primary and secondary lead extending out from the windings through the casing, at least one of said primary leads being exposed to high-voltage surges, a protective excess-voltage discharge device associated, at least with said exposed primary lead, for avoiding insulation failure due to excessive voltage surges, and low-voltage circuit-interrupting means mounted within the transformer-casing and electrically associated with said secondary leads for protecting the transformer against external faults on the secondary leads.

19. A surge-proof transformer-installation comprising, in combination; a transformer having a conducting casing, a high-voltage winding, a low-voltage winding, insulation between each winding and the casing, and between the two windings, said insulation being of different strengths on some of said windings, oil in said transformer-casing, high-voltage and low-voltage leads extending out from the respective windings through the casing, said low-voltage leads comprising two phase-leads and a neutral lead, means for grounding the neutral lead externally of the transformer, means for providing three-point protection for the insulation between each winding and the casing, and between the two windings, said three-point protective means comprising gap devices coordinated with the several insulations to be protected whereby the respective gap devices break down and relieve the insulation of excessive voltages before the insulation breaks down, at least one of said gap devices including a high-tension excess-voltage means associated with a high-voltage lead for providing an excess-voltage discharge from said associated lead to said casing in response to a predetermined increase in voltage over normal, said high-tension excess-voltage means also inherently operating in response to a reduction of the surge-voltage to substantially cut off said discharge promptly upon the return of normal voltage-conditions on the lead being protected, another of said gap devices being a preferred-path gap device of especially low voltage disposed between said neutral lead and said transformer-casing to afford a preferred discharge-path from said transformer-casing to said neutral lead rather than to said low-voltage phase-leads, and a circuit-interrupting device having contacts associated with said low-voltage phase-leads within said transformer, and tripping means for opening said contacts in response to both current and oil-temperature.

20. A surge-proof transformer-installation comprising, in combination, a transformer having a conducting casing, a high-voltage winding, a low-voltage winding, insulation between each winding and the casing, and between the two windings, said insulation being of different strengths on some of said windings, oil in said transformer-casing, high-voltage and low-voltage leads extending out from the respective windings through the casing, means for providing three-point protection for the insulation between each winding and the casing, and between the two windings, said three-point protective means comprising gap devices coordinated with the several insulations to be protected whereby the respective gap devices break down and relieve the insulation of excessive voltages before the insulation breaks down, at least one of said gap devices including protective means of a type which will change from substantially a non-conductor to a voltage-limiting conductor at a predetermined excess-voltage, and which will promptly change back again from a conductor to substantially a non-conductor when an excess voltage surge has been dissipated and the voltage returns to normal, and a circuit-interrupting device having contacts associated with said high-voltage leads within said transformer and inside of the connections to said protective means, and tripping means for opening said contacts in response to both current and oil-temperature.

21. A surge-proof transformer-installation comprising, in combination, a transformer having insulated windings, a conducting casing, oil in said transformer-casing, primary and secondary leads extending out from the windings through the casing, at least one of said primary leads being exposed to high-voltage surges, a protective excess-voltage discharge device associated, at least with said exposed primary lead, for avoiding insulation failure due to excessive voltage surges, and a circuit-interrupting device having contacts associated with at least one of said high-voltage leads within said transformer, and inside of the connections to said excess-voltage discharge device, said circuit-interrupting device comprising a thermal element in contact with, and normally responsive to the temperature of, the transformer oil, so as to normally have substantially the same temperature as the oil, and means responsive to a predetermined temperature of said thermal element for effecting an opening of said circuit-interrupter contacts.

22. In an electrical transformer comprising insulated high-voltage windings, insulated low-voltage windings, a conducting casing, insulating high-voltage and low-voltage bushings, one or more high-voltage leads connected to said high-voltage windings and passing out of the casing through said high-voltage bushings, and one or more low-voltage leads connected to said low-voltage windings and passing out of the casing through said low-voltage bushings; the combination, with said transformer, of circuit-interrupter means mounted within the transformer-casing, in at least one of the low-voltage leads of the transformer, for automatically open-circuiting said lead in response to a short-circuit thereon, and for automatically open-circuiting said lead also in response to high-internal-temperature conditions which are only slightly lower than a burn-out-producing condition of said transformer; and a fusible link disposed within the transformer-casing in the circuit of the high-voltage windings of the transformer, said fusible link being of a capacity suitable for affording protection only against the possibility of an internal fault in the primary windings, said fusible link having sufficient electrical resistance to cause it to be electrically heated to a fusing temperature which is materially in excess of the temperature of the ambient medium surrounding the link, upon the occurrence of excessive current-flow of predetermined magnitude.

23. A transformer-installation comprising, in combination, a transformer having insulated windings, a conducting casing, oil in said transformer-casing, leads extending out from the windings through the casing, and a circuit-interrupting device having relatively movable contacts associated with at least one of said leads within said transformer-casing, and tripping means for opening said contacts in response to both current and oil-temperature, the response to the oil-temperature being the controlling factor under light overload conditions of the order of 1½ to 3 times normal load, and the response to current being the controlling factor under short-circuit or heavy overload conditions of the order of 10 to 40 times normal current.

24. A transformer comprising insulated windings, a conducting casing, oil in said transformer-casing, primary and secondary leads extending out from the windings through the casing, and a circuit-interrupter mounted within the transformer-casing and having relatively movable contacts in series with at least one of said leads, said circuit-interrupter comprising a thermal element in contact with, and normally responsive to the temperature of, the transformer oil, so as to normally have substantially the same temperature as the oil, tripping means responsive to a predetermined temperature of said thermal element for effecting an opening of said circuit-interrupter contacts, and current-responsive means for quickly actuating said tripping means, independently of the oil-temperature, in the event of an extreme overcurrent.

25. A transformer-installation comprising, in combination; a transformer having insulated windings, a conducting casing, oil in said transformer-casing, and leads extending out from the windings through the casing; a thermal overload protector comprising, as an integral or self-contained unit, air-type circuit-breaker contact elements, tripping means therefor, a thermal element mounted underneath said contact elements and mechanically connected to said tripping means so as to open said contact elements in response to temperature conditions, and means for heating said thermal element in response to the transformer current; and means for mounting said overload protector as an attachment within the transformer-casing, with only its lower portion, including said thermal element, immersed in the transformer oil, said overload protector having its contact elements electrically connected in series with at least one of said leads within the transformer.

26. A transformer-installation comprising, in combination; a transformer having insulated windings, a conducting casing, oil in said transformer-casing, and leads extending out from the windings through the casing; a thermal overload protector comprising, as an integral or self-contained unit, air-type circuit-breaker contact elements, tripping means therefor, and a thermal element mounted underneath said contact elements and mechanically connected to said tripping means so as to open said contact elements in response to temperature conditions of the thermal element; and means for mounting said overload protector as an attachment within the transformer-casing, with only its lower portion, including said thermal element, immersed in the transformer-oil, said overload protector having its contact elements electrically connected in series with at least one of said leads within the transformer.

27. An electric transformer adapted to energize a customer's service line from an alternating-current feeder, said transformer comprising insulated windings, a conducting casing, primary and secondary leads extending out from the windings through the casing, and adapted to be connected respectively to the feeder and to the customer's service line, at least one of said primary leads being exposed to high-voltage surges, a protective excess-voltage discharge device associated, at least with said exposed primary lead, for avoiding insulation failure due to excessive voltage surges, said protective excess-voltage discharge device being capable of successfully providing a discharge-path for surge-currents of the order of 50,000 amperes or more, said primary leads including a fusible section not traversed by said surge-discharges, said fusible section having sufficient electrical resistance to cause it to be electrically heated to a fusing temperature which is materially in excess of the temperature of the ambient medium surrounding said fusible section, upon the occurrence of excessive current-flow of predetermined magnitude.

28. A surge-proof transformer-installation comprising, in combination, a transformer having insulated windings, a conducting casing, primary and secondary leads extending out from the windings through the casing, at least one of said primary leads being exposed to high-voltage surges, a protective excess-voltage discharge device associated, at least with said exposed primary lead, for avoiding insulation failure due to excessive voltage surges, and high-voltage circuit-interrupting means mounted within the transformer-casing and electrically associated with at least one of said primary leads inside of the connections of said excess-voltage discharge device and operative to quickly open the electric circuit thereof in response to excessive current-flow of predetermined magnitude.

29. A surge-proof transformer-installation comprising, in combination; a transformer having a conducting casing, a high-voltage winding, a low-voltage winding, insulation between each winding and the casing, and between the two windings, said insulation being of different strengths on some of said windings, high-voltage and low-voltage leads extending out from the respective windings through the casing, and means for providing adequate protection for the transformer-insulation, said protective means comprising gap devices coordinated with the several insulations to be protected whereby the respective gap devices break down and relieve the insulation of excessive voltages before the insulation breaks down, at least one of said gap devices including a diffuser having an enclosing tubular insulating member defining a diffuser chamber, terminal electrodes at the respective ends of said diffuser chamber, means for venting said diffuser chamber, and arc-responsive gas-evolving means in said diffuser chamber, said one of the gap devices, which includes said diffuser, being of such capacity as to provide a discharge-path for surge-currents as high as at least about 50,000 amperes for about 100 micro-seconds to half value.

30. A surge-proof transformer-installation comprising, in combination, a transformer having a conducting casing, a high-voltage winding, a low-voltage winding, insulation between each winding and the casing, and between the two windings, said insulation being of different strengths on some of said windings, high-voltage and low-voltage leads extending out from the respective windings through the casing, and means for providing adequate protection for the transformer-insulation, said protective means comprising gap devices coordinated with the several insulations to be protected whereby the respective gap devices break down and relieve the insulation of excessive voltages before the insulation breaks down, at least one of said gap devices including a diffuser mounted within said transformer-casing and having an enclosing tubular insulating member defining a diffuser chamber, terminal electrodes at the respective ends of said diffuser chamber, means for venting said diffuser chamber outside of the transformer casing, and arc-responsive gas-evolving means in said diffuser chamber, and substantially resistanceless connections connecting the terminal electrodes of said diffuser to a high-voltage lead and to the transformer casing, respectively.

31. A surge-proof transformer-installation comprising, in combination, a transformer having a conducting casing, a high-voltage winding, a low-voltage winding, insulation between each winding and the casing, and between the two windings, said insulation being of different strengths on some of said windings, oil in said transformer-casing, high-voltage and low-voltage leads extending out from the respective windings through the casing, means for providing three-point protection for the insulation between each winding and the casing, and between the two windings, said three-point protective means comprising gap devices coordinated with the several insulations to be protected whereby the respective gap devices break down and relieve the insulation of excessive voltages before the insulation breaks down, at least one of said gap devices including protective means of a type which will change from substantially a non-conductor to a voltage-limiting conductor at a predetermined excess-voltage, and which will promptly change back again from a conductor to substantially a non-conductor when an excess-voltage surge has been dissipated and the voltage returns to normal, and high-voltage circuit-interrupting means electrically associated with at least one of said primary leads inside of the connections of said excess-voltage discharge device and operative to quickly open the electric circuit thereof in response to excessive current-flow of predetermined magnitude.

JOHN K. HODNETTE.